United States Patent
Shah

(10) Patent No.: US 6,709,062 B2
(45) Date of Patent: Mar. 23, 2004

(54) HEAD RESTRAINT FOR A PASSENGER OF A VEHICLE

(76) Inventor: Mrugesh K. Shah, 403 Trails Ct., Houston, TX (US) 77024

( * ) Notice: Subject to any disclaimer, the term of this patent is extended or adjusted under 35 U.S.C. 154(b) by 0 days.

(21) Appl. No.: 09/963,327

(22) Filed: Sep. 27, 2001

(65) Prior Publication Data

US 2003/0057761 A1 Mar. 27, 2003

(51) Int. Cl.$^7$ .............................................. B60R 21/00
(52) U.S. Cl. .................. 297/464; 297/480; 297/216.12; 2/410; 2/411; 2/412; 2/414; 2/6.1; 2/6.2
(58) Field of Search ................................ 297/216.12, 480, 297/487, 393, 464; 2/410, 411, 412, 414, 6.1, 6.2, 6.6, 6.8

(56) References Cited

U.S. PATENT DOCUMENTS

| | | | | |
|---|---|---|---|---|
| 2,638,293 A | * | 5/1953 | Lindstrom | 297/480 |
| 3,170,659 A | * | 2/1965 | Wood, Jr. | 297/216.12 |
| 3,992,721 A | * | 11/1976 | Morton | 2/414 X |
| 4,044,399 A | * | 8/1977 | Morton | 2/414 |
| 4,231,117 A | * | 11/1980 | Aileo | 2/6.2 |
| 4,472,472 A | * | 9/1984 | Schultz | 2/410 X |
| 4,586,200 A | * | 5/1986 | Poon | 2/414 X |
| 4,664,341 A | * | 5/1987 | Cummings | 297/464 X |
| 4,923,147 A | * | 5/1990 | Adams et al. | 297/464 X |
| 4,953,234 A | * | 9/1990 | Li et al. | 2/412 |
| 5,003,631 A | * | 4/1991 | Richardson | 2/6.1 |
| 5,324,460 A | * | 6/1994 | Briggs | 2/411 X |
| 5,444,870 A | * | 8/1995 | Pinsen | 2/411 X |
| 5,475,878 A | * | 12/1995 | Dawn et al. | 2/411 |
| 5,669,079 A | * | 9/1997 | Morgan | 2/412 X |
| 5,937,446 A | * | 8/1999 | Fallert | 2/411 X |
| 6,094,750 A | * | 8/2000 | Lee | 2/412 |
| 6,263,514 B1 | * | 7/2001 | Chern | 2/410 |
| 6,282,724 B1 | * | 9/2001 | Abraham et al. | 2/412 |
| 6,305,028 B1 | * | 10/2001 | Lin | 2/410 |
| 2001/0002087 A1 | * | 5/2001 | Townsend | 297/480 X |
| 2001/0032335 A1 | * | 10/2001 | Nakayama et al. | 2/411 X |
| 2002/0043831 A1 | * | 4/2002 | Alsup | 297/216.12 |

* cited by examiner

Primary Examiner—Peter M. Cuomo
Assistant Examiner—Rodney B. White
(74) Attorney, Agent, or Firm—Harrison & Egbert

(57) ABSTRACT

A head restraint for a passenger of a vehicle including a seat with a seat back, a helmet pivotally secured to the seat back and having an interior for receiving a human head therein, and an inertia harness connected to the helmet for restricting relative movement of the helmet upon application of forces beyond a desired level to the vehicle. A universal joint secures the helmet to the seat back. The helmet includes a rigid outer shell, a resilient member layer affixed to an interior surface of the outer shell, a packing layer affixed to an interior surface of the resilient member layer, and a pliable layer affixed to an interior surface of the packing layer. The resilient member layer includes a plurality of springs. The packing layer includes a bubble wrap material or a plurality of randomly disposed foam elements. The pliable layer includes a layer of silicone material lined around the surface of the packing layer.

10 Claims, 3 Drawing Sheets

HEAD RESTRAINT FOR A PASSENGER OF A VEHICLE

BACKGROUND OF THE INVENTION

1. Field of the Invention

The present invention relates to a device which is adapted to protect a passenger's head in a motor vehicle in the case of impact, especially frontal collisions. More particularly, the present invention relates to helmet-type devices which are secured to the vehicle for the purpose of protecting and cushioning any blows to the human head caused by collisions.

2. Description of Related Art

A number of devices have been suggested heretofore to prevent or at least to reduce the damages ensuing to the passengers of a motor vehicle in the case of an accident. These include devices of different kinds, such as padding the vehicle interior, pneumatic cushions which automatically inflate at the time of impact, and seat belts permanently in position in the sense that after the initial fastening operation they remain in active position as long as the passengers are in the interior of the vehicle.

Such devices are also used in combination when the devices of a single type do not solve the problem of passenger protection in a satisfactory manner. For example, the seat belt devices have the advantage of not being as bulky as padding while simultaneously providing safety to the passenger in the vehicle. Seat belts require only the initial (manual) fastening operation and there is no risk of failure as, conversely, may happen with pneumatic cushions (e.g. in the case of defects in the inflation apparatus). The seat belts only offer protection which is limited to only a few parts of the passenger's body and, in the majority of the cases, the head, in particular, is excluded from the protection.

Statistical findings on accidents, in laboratory tests carried out to simulate the accidents, have shown that seat belts, for example, lap and shoulder belts, afford good protection until the velocity at impact is not too high. If, conversely, the velocity is high, while the passenger's body is firmly held on the seat, the head is subjected to a movement which is neither controlled nor braked and which causes stresses on the head which are above the tolerability threshold. For these reasons, there is a need for a protection system which is based on the use of safety belts capable of protecting in the case of impact, the passenger's body, more particularly, the trunk, and a device, cooperating with the belts, and especially provided for the protection of the head.

In the past, various U.S. Patents have issued relating to devices for protecting the passenger's head. For example, U.S. Pat. No. 3,953,049, issued on Apr. 27, 1976 to Surace et al., describes an inflatable head protector adapted for protecting the passenger's head in the case of collision. The safety device comprises a protective strip which unfolds itself in a spatial form generated by rotation of a U-shaped line about an axis passing through the ends of the U-shaped line. The axis is horizontal and transverse with respect to the vehicle and is at the level of the head, behind the head. At the instant of impact, the strap is inflated by a pressurized gas and is unfolded so as to become positioned in front of the passenger's head.

U.S. Pat. No. 3,753,576, issued on Aug. 21, 1973 to J. F. Gorman, describes a vehicle safety device comprising an expandable composite element provided with a mounting for location in a vehicle and which is expandable from an inoperative retracted position to an operative expanded position. There is a means for rapidly filling the element with a filler material so as to cause the expansion. The element includes an outer shield which expands first and an inner shield which extends inwardly therefrom. The shield extends over the human head and across the torso of the human body.

U.S. Pat. No. 4,909,459, issued on Mar. 20, 1990 to M. H. Patterson, describes a helmet-mounted head restraint which restrains the forward and downward movement of the occupant's head when subjected to large deceleration forces. The restraint includes a strap assembly which encircles the back of the occupant's head and releasably connects to the helmet adjacent to each of the passenger's ears. A restraining strap is slidably connected by a loop to the strap assembly and extends behind the head through a retracting means fixed in the seat. The retracting means pulls the head back against the seat when deceleration forces exceed a predetermined level. The device is particularly designed for aircraft operations.

U.S. Pat. No. 3,795,412, issued on Mar. 5, 1974 to A. E. John, describes a vehicle safety device having a roof housing for storing a plurality of inflatable, spaced apart tubes carrying a sleeve of netting material adapted to surround and confine the occupants upon deployment. The netting and inflated tubes are positioned around the occupants and the back of the seat to restrain the occupants from forward and lateral movement.

In the past, various helmets have been designed for the protection of the head during physical activity. For example, U.S. Pat. No. 5,586,200, issued on May 6, 1986 to M. C. Poon, describes a crash helmet having a plurality of protective layers. One of the protective layers includes inflatable air bubbles whose pressure and size may vary when connected to an outside air pressure supply. U.S. Pat. No. 5,444,870, issued on Aug. 29, 1995 to D. Pinsen, describes a football helmet and shoulder pad combination. The helmet portion is resiliently coupled to the shoulder pad. U.S. Pat. No. 4,354,284, issued on Oct. 19, 1982 to E. R. Gooding, describes a protective liner for outdoor headgear in which a plurality of fluid-filled cushions have walls of resilient material joined together in a regular and spaced relationship around the interior of the headgear. The cushions are interconnected by fluid-carrying passages so as to facilitate the dispersing of the impact forces laterally. U.S. Pat. No. 5,685,021, issued on Nov. 11, 1997 to K. Tsujino, describes a protective wrestling headgear having a layer of gel cushioning material, preferably silicon gel, covering the interior surface.

It is an object of the present invention to provide a head restraint for a passenger of a vehicle which effectively prevents head injuries from occurring.

It is a further object of the present invention to provide a head restraint which allows normal movement within the vehicle while preventing movement of the head during the application of strong deceleration forces to the vehicle.

It is a further object of the present invention to provide a head restraint which will fit comfortably over the human head.

It is another object of the present invention to provide a head restraint which is easy to use, relatively inexpensive and easy to manufacture.

These and other objects and advantages of the present invention will become apparent from a reading of the attached specification and appended claims.

BRIEF SUMMARY OF THE INVENTION

The present invention is a head restraint for a passenger of a vehicle comprising a seat, a helmet pivotally secured to the seat back of the seat and having an interior suitable for receiving a human head therein, and an inertia harness means connected to the helmet for restricting relative movement of the helmet upon application of deceleration forces beyond a desired level.

A universal joint secures the helmet to the top surface of the seat back. The helmet is connected to this universal joint.

The helmet includes a rigid outer shell, a resilient member layer affixed to an interior surface of the outer shell, a packing layer affixed to an interior surface of the resilient member layer, and a pliable layer affixed to an interior surface of the packing layer. The pliable layer is suitable for direct contact with the human head. In an alternative form of the present invention, a mask portion can be affixed to the outer shell and extend downwardly therefrom. The resilient member layer includes a plurality of springs interposed between the outer shell and the packing layer. Each of the plurality of springs has one end secured to the outer shell and an opposite end secured to the packing layer. The packing layer can either be a bubble wrap material or a plurality of randomly disposed foam elements. The pliable layer is a silicone material lined around the interior surface of the packing layer. The mask is of a transparent rigid material.

The inertia harness means comprises a belt affixed to the helmet and extending rearwardly of the seat back, and a retraction mechanism cooperative with the belt and positioned rearwardly of the seat back. The retraction mechanism limits forward movement of the helmet upon application of deceleration forces by the vehicle.

DETAILED DESCRIPTION OF THE INVENTION

Figure 1:
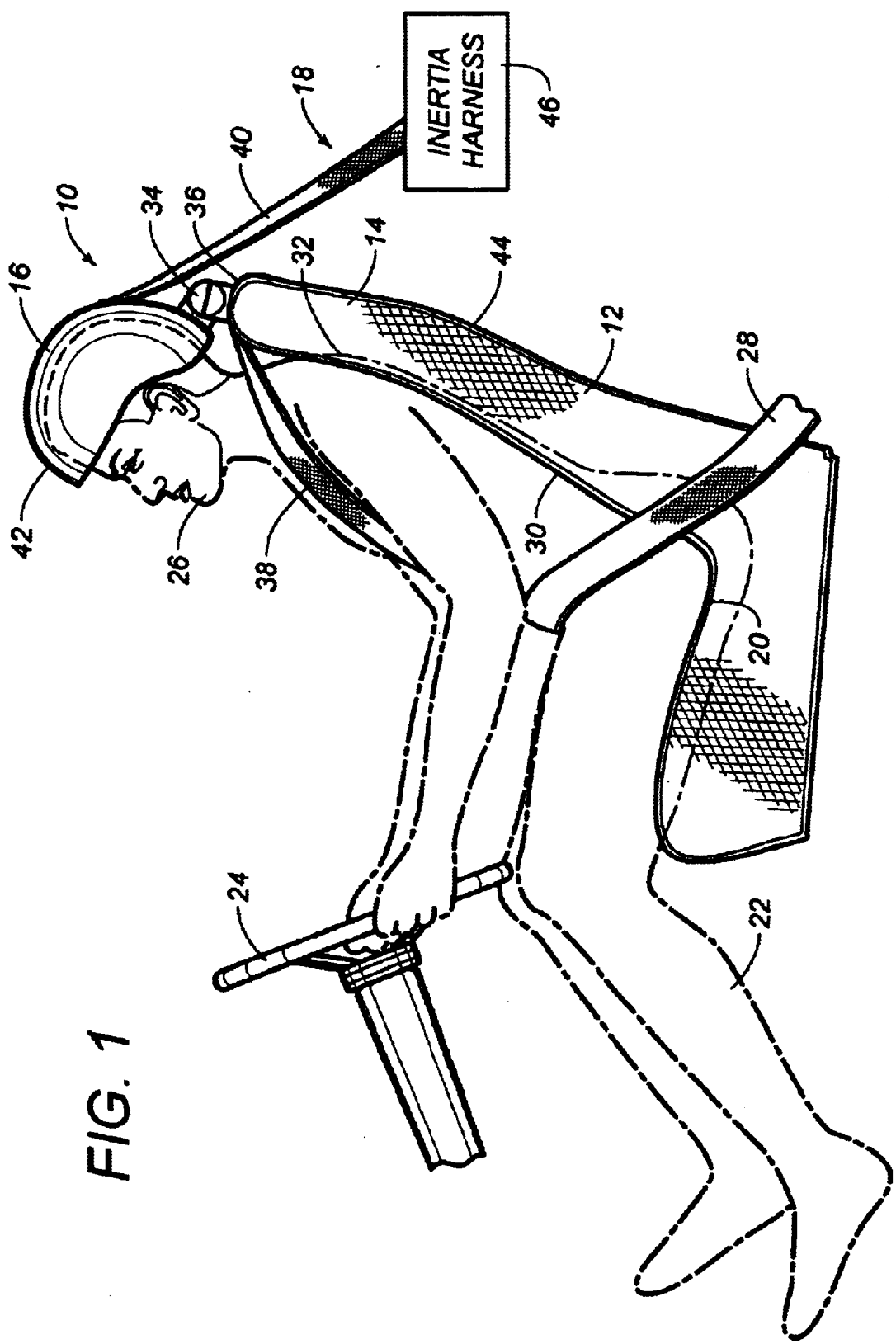
FIG. 1 is a side elevational and partially diagrammatic illustration of the head restraint apparatus of the present invention.

Referring to FIG. 1, there is shown at 10 the head restraint system in accordance with the teachings of the present invention. The head restraint system 10 includes a seat 12 having a seat back 14, a helmet 16 pivotally secured to the seat back 14, and an inertia harness 18 connected to the helmet 16 so as to restrict relative movement of the helmet 16 upon the application of deceleration forces beyond a desired level to the vehicle in which the seat 12 is placed.

In FIG. 1, it can be seen that the seat 12 includes a sitting portion 20 upon which the driver 22 is positioned. The driver 22 is illustrated in a driving position holding the steering wheel 24. The head 26 of the driver 22 is positioned within the helmet 16. A conventional seat belt 28 extends around the waist of the driver 22 at above the sitting portion 20 of seat 12. The driver 22 is positioned so as to have his or her back 30 resting against the interior surface 32 of the seat back 14.

A universal joint 34 is used so as to connect the helmet 16 to the top surface 36 of the seat back 14. The universal joint 34 will allow the helmet 16 to move up-and-down and side-to-side in a manner so that the driver 22 can turn his or her head as desired or move or his or her head upwardly and downwardly as desired. A shoulder harness 38 will extend downwardly from the top 36 of the seat back 14 and across the chest of the driver 22 so as to secure the driver 22 in a properly restrained position. In normal use, the helmet 16 can be lifted upwardly and downwardly so that the interior surface of the helmet 16 will receive the human head 26 therein.

A belt 40 is connected to the rigid outer shell 42 of the helmet 16. The belt 40 extends rearwardly beyond the back 44 of the seat back 14. A retraction mechanism 46 is positioned rearwardly of the seat back 44 and receives the opposite end of the belt 40 from the helmet 16. The inertia harness mechanism 46 operates similar to the inertia harnesses used for the seat belt 28 and/or the shoulder harness 38. The inertia harness mechanism 46 will allow relative upward and downward or sideways movement of the head 26 until strong deceleration forces are applied to the vehicle, such as in the event of an accident. At such time, the inertia harness mechanism 46 will serve to lock the belt 40 so as to prevent pivotal or side-to-side movement of the helmet 16. As a result, the head 26 of the driver 22 will be properly restrained. The head restraint apparatus 10 prevents the head 26 from snapping forward and causing concussion injuries. By retaining the head 26 in a properly fixed position and by providing a cushioning material within the rigid shell 42 of the helmet 16, injuries to the head 26 are effectively prevented by the system 10 of the present invention. The present invention will prevent the head 26 from ever encountering the surface of the steering wheel 24 or the dashboard in the event of an accident.

Figure 2:
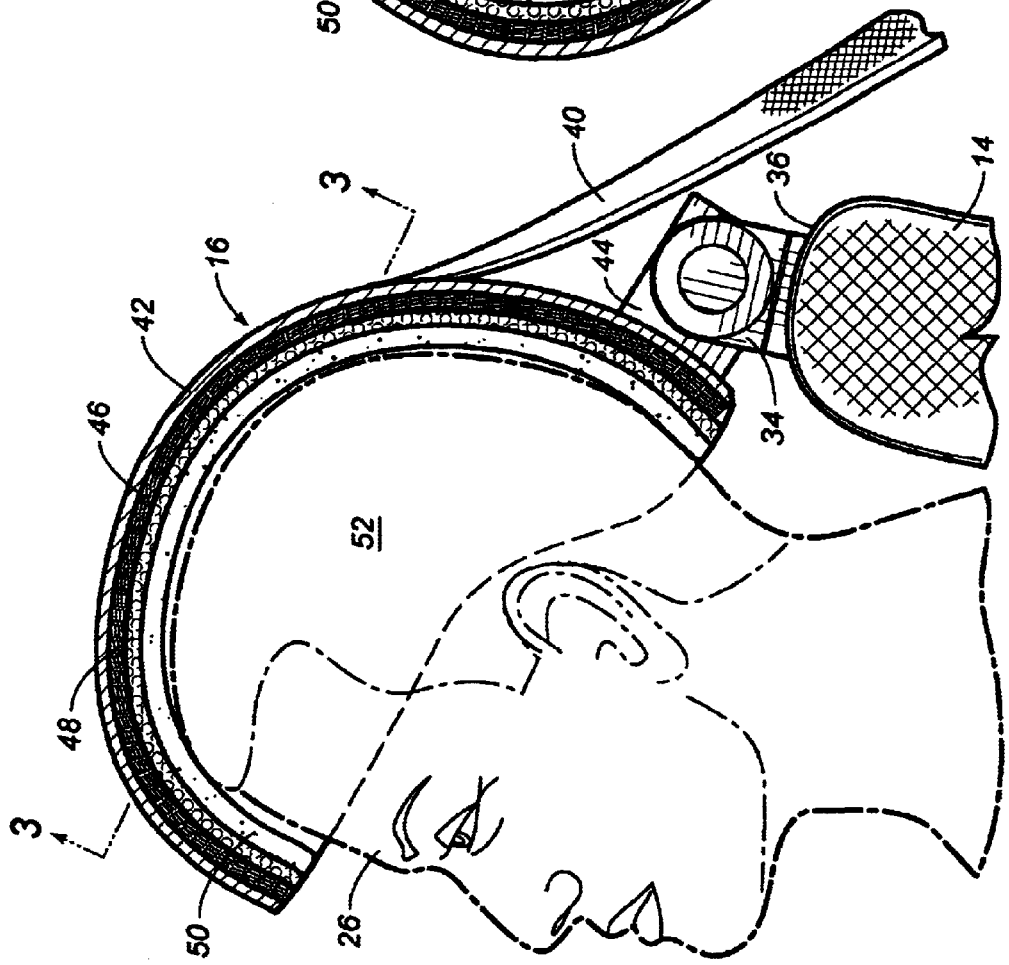
FIG. 2 is a cross-sectional view of the interior of the helmet as used in the head restraint apparatus of the present invention.

FIG. 2 shows an interior view of the helmet 16 of the present invention. In FIG. 2, it can be seen that the belt 40 is affixed to the rigid outer shell 42 of the helmet 16. An arm 44 is also connected to the exterior surface of the rigid shell 42 and extends rearwardly to the universal joint 34. Universal joint 34 is shown as affixed to the top surface 36 of the seat back 14. Various configurations of universal joints 34 can be made within the scope of the present invention. It is important that the universal joint 34 be capable of allowing side-to-side pivotal movements of the helmet 16 and upward and downward movements of the helmet 16.

In FIG. 2, it can be seen that the helmet 16 includes a resilient member layer 46 extending around the interior surface of the rigid shell 42. A packing layer 48 extends around the interior surface of the resilient member layer 46. A pliable layer 50 is affixed so as to extend along the interior surface of the packing layer 48. As can be seen, the skull 52 of head 26 will reside against and within the pliable layer 50. The use of the pliable layer 50 allows the helmet 16 to conveniently, comfortably and securely receive the skull 52 of head 26.

Figure 3:
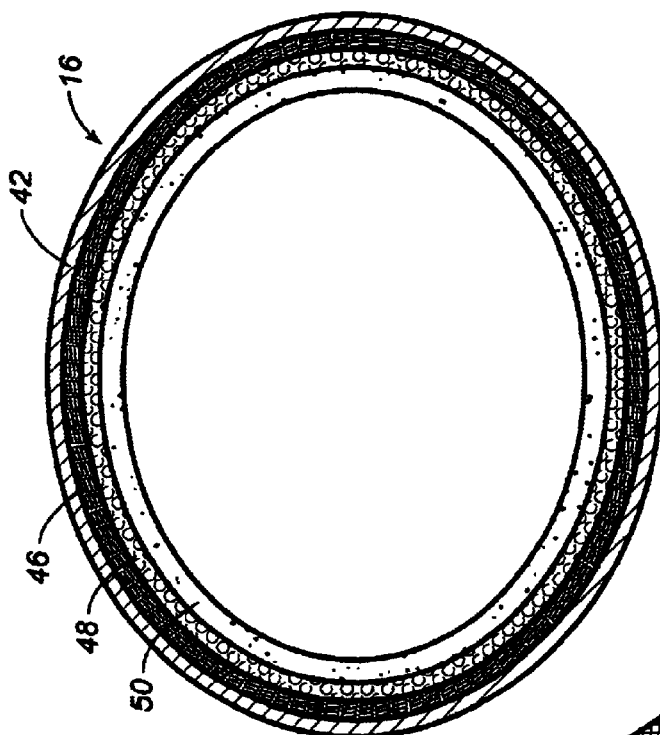
FIG. 3 is a cross-sectional view taken across lines 3—3 of FIG. 2.

FIG. 3 shows the details of the helmet 16 and, in particular, the arrangement of the various layers within the interior of the rigid shell 42 of helmet 16.

In FIG. 3, it can be seen that the resilient member layer 46 extends around the interior surface of the rigid outer shell 42. The resilient member layer 46 comprises a plurality of springs interposed between the outer shell and the packing layer 48. Each of the plurality of springs which make up the resilient member layer 46 have one end secured to the outer shell 42 and an opposite end secured to the packing layer 48. These springs 46 will serve to cushion any impact caused by the compression of the human head 26 against the rigid outer shell 42.

The packing layer 48 can comprise a bubble wrap material interposed between the pliable layer 50 and the resilient member layer 46. Alternatively, the packing layer 48 can comprise a plurality of foam elements, such as foam peanuts, randomly disposed between the resilient member layer 46 and the pliable layer 50. The pliable layer 50 is a silicone material lined around the interior surface of the packing layer 48. It has been found that this configuration of various layers within the rigid outer shell 42 effectively cushions any impact caused by the forward movement of the head 26 during the application of strong deceleration forces, such as during an accident.

Figure 4:
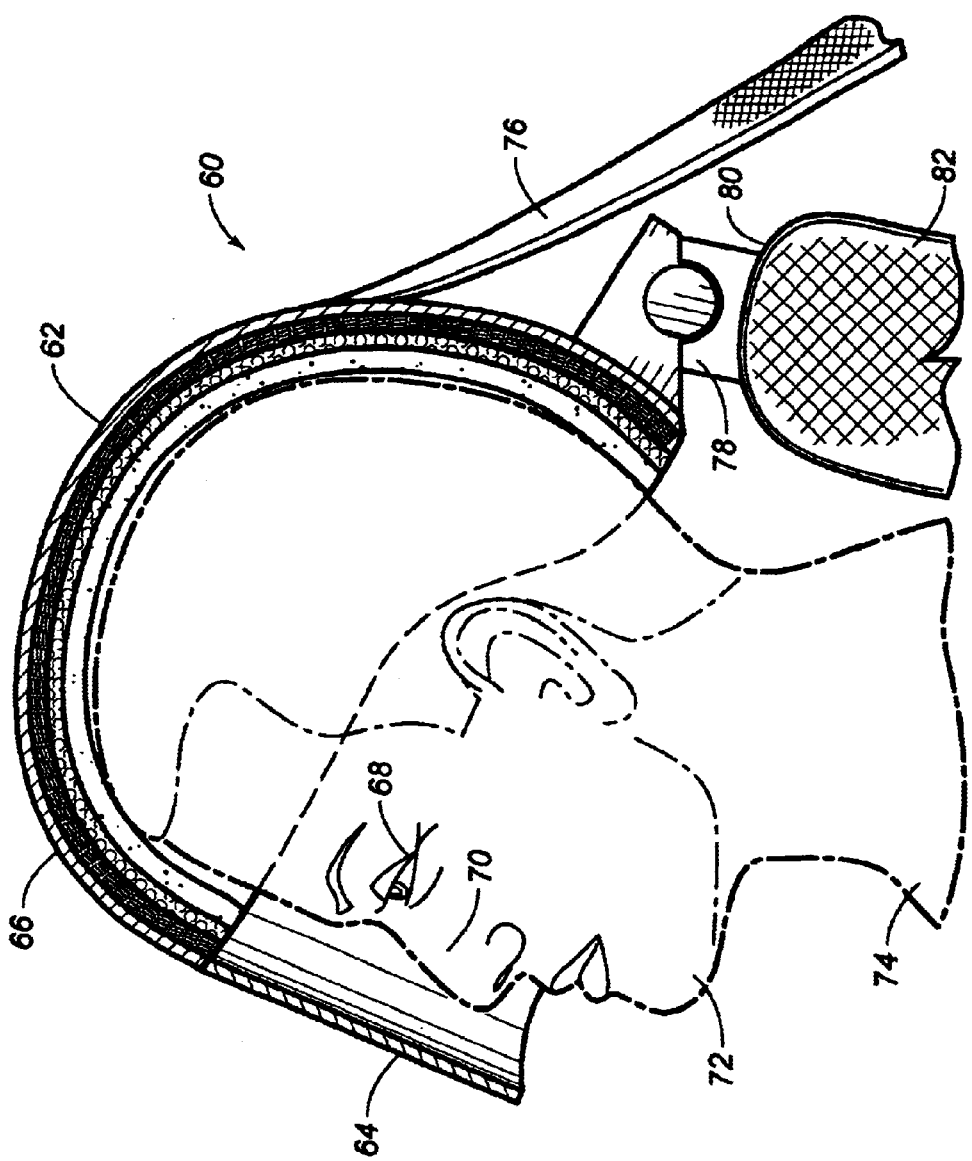
FIG. 4 is a cross-sectional view showing the alternative embodiment of the present invention having a mask portion extending downwardly from the helmet.

FIG. 4 shows an alternative embodiment 60 of the present invention in which the helmet 62 has a mask portion 64 extending downwardly from the rigid outer shell 66. The helmet 62 has a configuration similar to that described in conjunction with FIGS. 2 and 3. The mask 64 is formed of a transparent rigid polymeric material. The mask 64 will extend downwardly over the eyes 68 and nose 70 of the head 72 of the driver 74. The mask portion 64 will prevent accidental injury to the eyes 68 and/or nose 70 of the driver 74 in the event of an accident. The mask 64 will prevent flying objects from damaging the eyes 68 or nose 70. Alternatively, the mask 64 will also serve to distribute any forces applied by contact between flying objects or stationary objects within the interior of the vehicle from damaging the face 72 of the driver 74.

FIG. 4 also shows that a belt 76 is affixed to the rigid shell 66 and extends rearwardly therefrom (in the manner shown previously in FIG. 2). A different type of universal joint 78 is applied to the top 80 of the seat back 82 so as to allow relative movement between the helmet 62 and the seat back 82.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A head restraint for a passenger of a vehicle comprising:
   a seat having a seat back;
   a universal joint directly secured to a top surface of said seat back;
   a helmet directly connected to said universal joint so as to pivot with respect to said seat back, said helmet having an interior for receiving a human head therein, said helmet further comprising:
   a rigid outer shell;
   a resilient member layer affixed to an interior surface of said outer shell, said resilient member layer being a plurality of springs;
   a packing layer affixed to an interior surface of said resilient member layer, said plurality of springs interposed between said outer shell and said packing layer; and
   a pliable layer affixed to an interior surface of said packing layer, said pliable layer suitable for direct contact with the human head, said packing layer comprising a bubble wrap material interposed between said resilient member layer and said pliable layer; and
   an inertia harness means connected to said helmet, said inertia harness means for restricting relative movement of said helmet upon application of forces beyond a desired level to the vehicle.

2. The head restraint of claim 1, further comprising:
   a mask portion affixed to said outer shell and extending downwardly therefrom.

3. The head restraint of claim 2, said mask portion being of a transparent rigid material.

4. The head restraint of claim 1, each of said plurality of springs having one end secured to said outer shell and an opposite end secured to said packing layer.

5. The head restraint of claim 1, said pliable layer comprising a silicone material lined around said interior surface of said packing layer.

6. The head restraint of claim 1, said inertia harness means comprising:
   a belt affixed to said helmet and extending rearwardly of said seat back; and
   a retraction mechanism cooperative with said belt and positioned rearwardly of said seat back, said retraction mechanism limiting forward movement of said helmet upon the application of braking forces by the vehicle.

7. A helmet for a head restraint apparatus for protecting a passenger of a vehicle comprising:
   a rigid outer shell;
   a resilient member layer affixed to an interior surface of said outer shell, said resilient member layer being a plurality of springs, said plurality of springs interposed between said outer shell and said packing layer, each of said plurality of springs having a one end secured to said outer shell and an opposite end secured to said packing layer;
   a packing layer affixed to an interior surface of said resilient member layer; and
   a pliable layer affixed to an interior surface of said packing layer, said pliable layer suitable for direct contact with the human head, said packing layer comprising a bubble wrap material interposed between said resilient member layer and said pliable layer.

8. The helmet of claim 7, further comprising:
   a mask portion affixed to said outer shell and extending downwardly therefrom.

9. The helmet of claim 7, said mask portion being of a transparent rigid material.

10. The helmet of claim 7, said pliable layer comprising a silicone material lined around said interior surface of said packing layer.

* * * * *